June 13, 1933.  W. C. ANDERSON  1,913,581
NUT HULLER
Filed Sept. 8, 1931   2 Sheets-Sheet 1
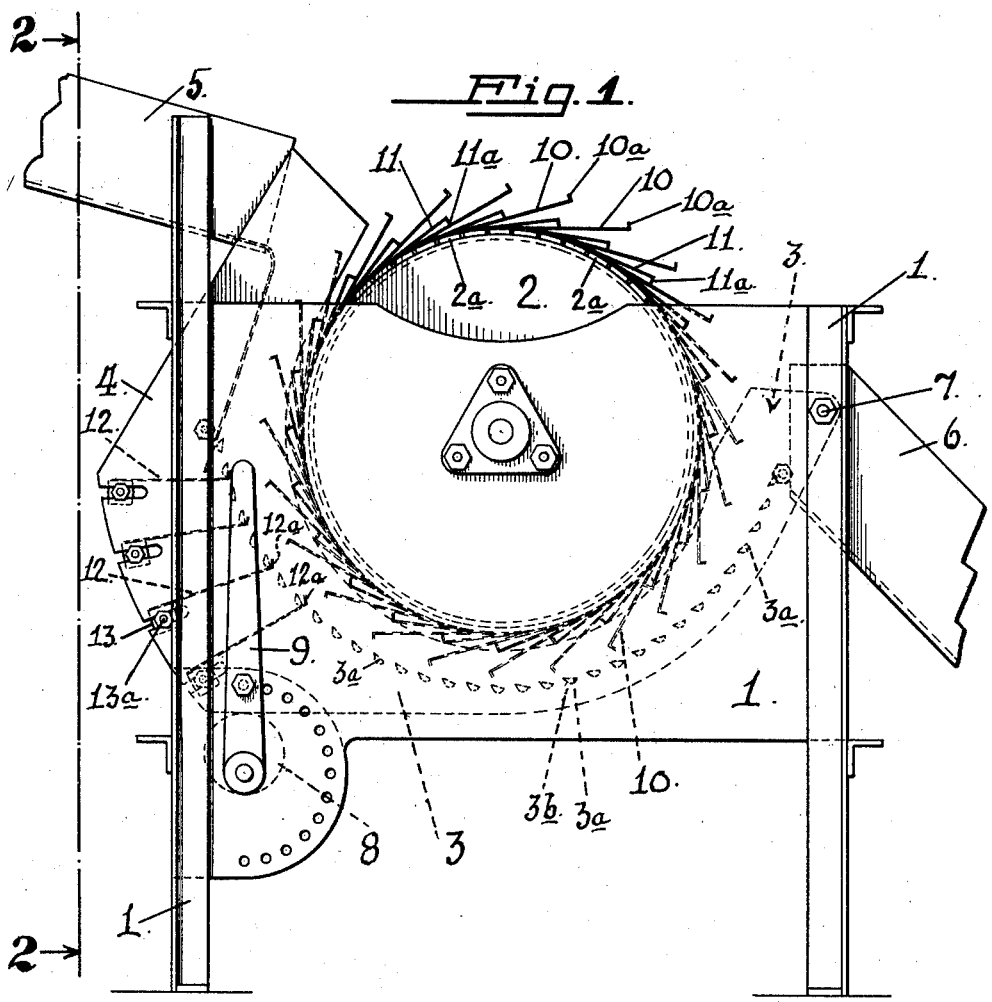
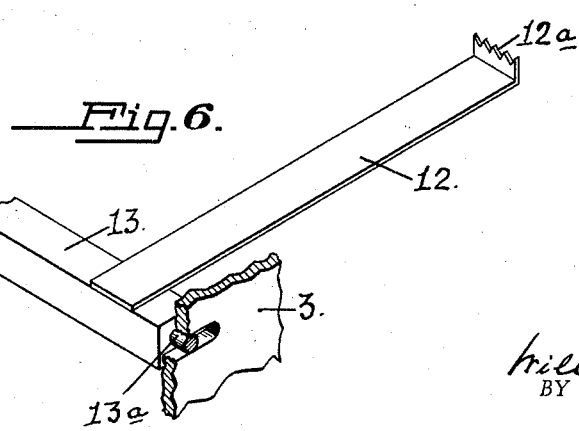
INVENTOR,
William C. Anderson
BY Booth + Booth
ATTORNEYS.

June 13, 1933.  W. C. ANDERSON  1,913,581
NUT HULLER
Filed Sept. 8, 1931  2 Sheets-Sheet 2
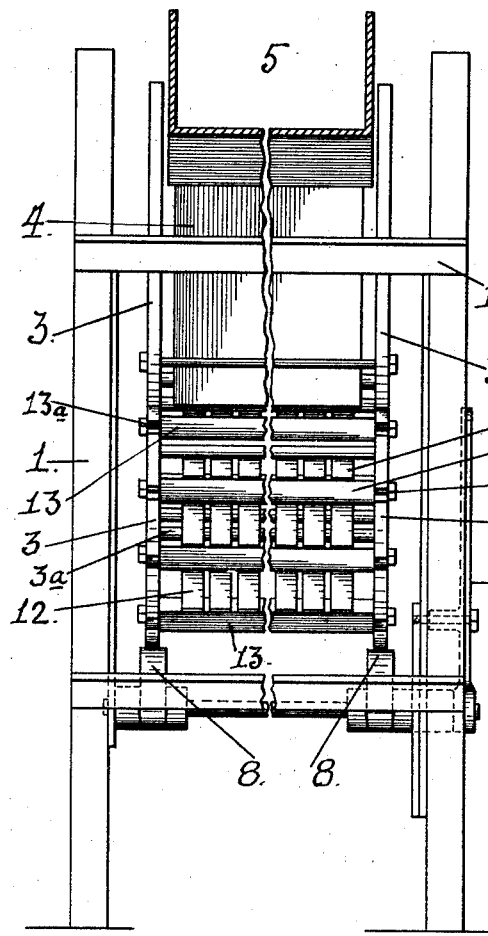
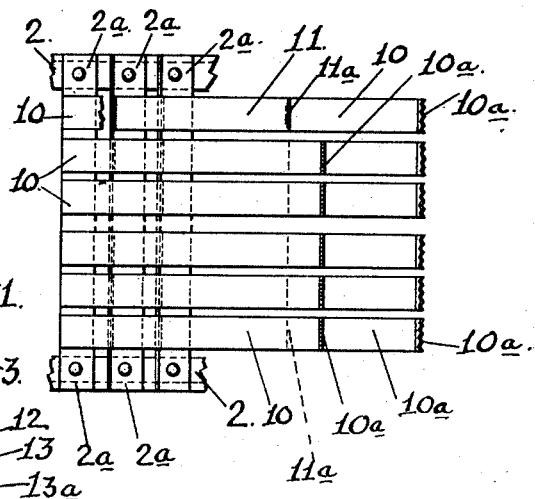
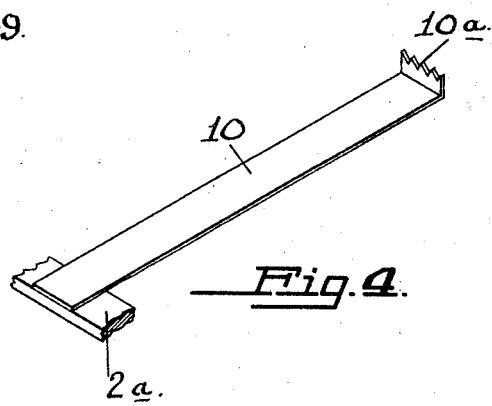
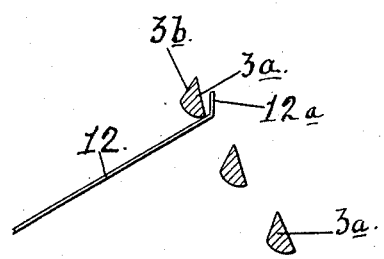
INVENTOR,
William C. Anderson.
BY Booth & Booth.
ATTORNEYS.

Patented June 13, 1933

1,913,581

UNITED STATES PATENT OFFICE

WILLIAM C. ANDERSON, OF LOS GATOS, CALIFORNIA

NUT HULLER

Application filed September 8, 1931. Serial No. 561,739.

My invention relates in general to the class of nut-hullers; and in particular to that type in which the hulls are torn off in the space between a rotating cylinder and a fixed grated concave, by the shredding action of resilient fingers carried by the cylinder, in conjunction with the spaced, peripheral grate bars of the concave.

One object of my invention is to increase the capacity of the machine by exposing the nuts more effectively to improved shredding members, the action of which is insured, regardless of mass nut volume and rate of passage.

This object I attain by the addition of a supplementary set of resilient tearing fingers carried by the concave in association with its grate bars, and acting in conjunction therewith and with the main tearing fingers.

Another object is to prevent the nuts from working in between the resilient fingers of the cylinder to a depth which tends to destroy partially or even wholly their proper yielding and nesting function.

This object is reached by placing between said fingers certain stops which confine the possible entrance of the nuts between them to a safe depth from which they can automatically clear themselves by dropping out.

Another object is to increase the grating effect of the fixed bars of the concave, which object is the result of a novel relative arrangement of said bars in the arc of the concave, and their novel conformation in that they present sharp front edges fully exposed to the passing nuts.

These and other objects will hereinafter fully appear, it being well to state at this point that though my machine is adapted for any nuts which have comparatively soft hulls capable of being thus torn and shredded, it is particularly adapted for the hulling of walnuts.

In the accompanying drawings, I have illustrated the machine in its preferred form, though it is to be understood that changes in arrangement and structural details may be made without departing from the spirit of the invention as defined in the claims hereunto appended.

In the drawings, Fig. 1 is a side elevation of my nut huller.

Fig. 2 is an end view, broken, and partly in section, looking from the line 2—2 of Fig. 1.

Fig. 3 is a fragmentary plan view of the overlapping main tearing fingers of the rotating cylinder.

Fig. 4 is a perspective view of one of the main tearing fingers.

Fig. 5 is a diagrammatic view showing the angular, relative arrangement of the grate bars of the concave, their sharp fronts and the association of one of the supplementary resilient tearing fingers.

Fig. 6 is a perspective of one of said last named fingers.

1 is the frame in which is mounted for rotation the cylinder 2, and the underlying stationary concave 3 between which two members lies the hulling zone, after the manner of thrashers, separators and like machines.

4 is the feed hopper extension of the concave leading to the hulling zone; 5 is the feed chute to said extension; and 6 is the delivery chute leading from said zone.

The concave 3 is pivoted at 7, and is adapted by means of the eccentrics 8 and lever 9 to be adjusted to and from the cylinder 2 in order to vary the cross-sectional dimensions of the hulling zone, as may be necessary according to the nature and size of the nuts to be hulled.

The cylinder 2 has its periphery composed of bars 2a parallel with its axis and extending from end to end Fig. 3. To these bars are secured by one end the main tearing fingers 10 of the well known general type in so far that they comprise a great number of overlapping, independent, relatively narrow and long resilient strips, substantially tangential to the perimeter of the cylinder, each having at its free end an outwardly projecting flange forming a tearing toe 10a, which preferably has a serrated edge, as shown in Figs. 3 and 4. The concave 3 has its inner peripheral arc composed of fixed grate bars 3a spaced apart and extending from side to side parallel with the axis of the cylinder 2.

Thus far the machine is not essentially different, either in construction or operation from those heretofore known, in that the resilient fingers 10 of the rotating cylinder 2, in conjunction with the fixed spaced grate bars 3a of the concave 3, shred and tear off the hulls of the nuts passing through the hulling zone, the shredded fragments of the hulls dropping through between said bars and the hull-free nuts being delivered to the chute 6.

My several improvements may now be referred to.

It has been found in practice that the multitudinous array of resilient tearing fingers 10 of the cylinder, overlapping and in effect forming a substantially complete outer shell which should perforce, under the pressure of the nut mass, resiliently yield and nest compactly, frequently does not do so, because of the entrance of nuts between the free ends of said fingers to such a depth as not only to prevent such yielding and nesting, but also to jam the nut so that it will not fall out. Thus damage ensues and a stoppage for repairs and relief and a waste of time.

According to my improvement herein I overcome this difficulty by placing between the overlapping fingers 10, a stop member, sufficiently close to their free ends to prevent the deep, jamming entrance of a nut therebetween, whereby the yielding of the fingers will not be materially impaired and the nut itself will automatically drop out. This stop, it will be seen, assumes the form of a strip 11 lying between the fingers 10, the outer end of the stop strip being flanged at 11a, or otherwise thickened, said end being quite near the free ends of the fingers between which it lies, Fig. 1. In constructive detail, the fingers 10 and the stop strips 11 are secured to alternate bars 2a of the cylinder 2.

The spaced grate bars 3a of the concave 3, according to my improvement, are partly half-round in section, their diameters facing inwardly, and at a slight angle to each other, as best shown in Fig. 5, in a direction to elevate their front edges which face the direction of rotation of the cylinder; and these front edges are preferably sharpened by beveling, as seen at 3b, to present a retreating, but still sufficiently sharp surface.

This out of line succession of the bars 3a and their shape, provide both for effective tearing action, and for insurance against dragging and clogging in their contact with the nuts, especially preventing damage to the nuts during the latter part of the operation when said nuts are partially or wholly divested of their hulls.

The ever increasing requirement of modern practice for mass production and speed of treatment especially with regard to comestibles has been a constant incentive to improved methods and machines. In the present case, the special application concerns the ability to supply the nuts in larger volume and yet hull them effectively, and with certainty. I have found that the addition of a set of supplementary resilient tearing fingers properly placed is of advantage in this regard. These fingers are indicated by the numeral 12. They are, as seen in Fig. 6, relatively long and narrow springy strips secured adjustably as at 13a at their outer ends to outer cross bars 13 of the concave 3, and thence freely passing radially inwardly to and between the grate bars 3a of said concave to a point within the hulling zone, Figs. 1 and 5. They may be in number sufficient to pass through successive grate-bar spaces, or in a lesser number, as for example, the alternate arrangement shown in Fig. 1, located in the beginning of the hulling zone, where the more intense effect is needed. The free end of each strip 12 is provided with a tearing toe flange 12a preferably having a serrated edge and extending in a direction opposing the advance of the nuts. The supplementary strips or fingers being on the side of the nut mass opposite to that of the main fingers 10, thus add to the shredding and tearing effect, and moreover they serve to keep such spaces as they lie between free and open to the falling out of the shredded hulls.

I claim:—

1. A nut-huller comprising a rotatable cylinder; a stationary, grated concave spaced from the cylinder to form the intervening hulling zone; a plurality of resilient fingers carried by and extending tangentially from the cylinder in a direction opposite to the cylinder's rotation, said fingers successively overlapping and the free end of each having a tearing toe; a plurality of tangential strips carried by the cylinder between said fingers, the free ends of said strips constituting stops adapted to restrict the entrance of nuts between the overlapping ends of the fingers; and spaced bars forming the grating of the concave.

2. A nut huller comprising a rotatable cylinder; a stationary, grated concave spaced from the cylinder to form the intervening hulling zone; a plurality of resilient, main fingers carried by and extending tangentially from the cylinder in a direction opposite to the cylinder's rotation, said fingers successively overlapping and the free end of each having a tearing toe; spaced cross bars forming the grating of the concave; and a plurality of resilient supplementary fingers carried by the concave and extending through between the grating bars into the hulling zone, their free ends being provided with a tearing toe.

3. A nut huller comprising a rotatable cylinder; a stationary, grated concave spaced from the cylinder to form the intervening hulling zone; a plurality of resilient, main fingers carried by and extending tangentially from the cylinder in a direction opposite to the cylinder's rotation, said fingers, successively overlapping and the free end of each having a tearing toe; spaced cross bars forming the grating of the concave; and a plurality of resilient supplementary fingers carried by the concave and extending through between the grating bars into the hulling zone, their free ends being provided with a tearing toe, said supplementary fingers being linearly adjustable to regulate their projection into the hulling zone.

4. A nut-huller comprising a rotatable cylinder; a stationary, grated concave spaced from the cylinder to form the intervening hulling zone; a plurality of resilient fingers carried by and extending tangentially from the cylinder in a direction opposite to the cylinder's rotation, said fingers successively overlapping, and the free end of each having a tearing toe, stops carried by the cylinder, lying between said fingers adjacent their overlapping free ends, adapted to control the entrance of the nuts between said ends; spaced bars forming the grating of the concave; and a plurality of resilient supplementary fingers carried by the concave and extending through between the grating bars into the hulling zone, their free ends being provided with a tearing toe.

In testimony whereof I have signed my name to this specification.

WILLIAM C. ANDERSON.